US012700922B1

(12) United States Patent
Pauling et al.

(10) Patent No.: US 12,700,922 B1
(45) Date of Patent: Aug. 4, 2026

(54) SYSTEMS AND METHODS FOR DIAGNOSING ANOMALIES OCCURRING WITHIN A PASSIVE OPTICAL NETWORK VIA INTEGRATED DOMAINS

(71) Applicant: FRONTIER COMMUNICATIONS HOLDINGS, LLC, Dallas, TX (US)

(72) Inventors: Bryan Pauling, Rochester, NY (US); John Valdez, Copper Canyon, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 19/438,292

(22) Filed: Dec. 31, 2025

Related U.S. Application Data

(60) Provisional application No. 63/888,979, filed on Sep. 26, 2025.

(51) Int. Cl.
| | |
|---|---|
| *H04B 10/03* | (2013.01) |
| *H04B 10/077* | (2013.01) |
| *H04J 14/02* | (2006.01) |
| *H04L 41/0677* | (2022.01) |

(52) U.S. Cl.
CPC ......... *H04B 10/03* (2013.01); *H04B 10/0773* (2013.01); *H04L 41/0677* (2013.01); *H04J 14/023* (2013.01)

(58) Field of Classification Search
None
See application file for complete search history.

(56) References Cited

U.S. PATENT DOCUMENTS

| | | | |
|---|---|---|---|
| 11,101,884 B1* | 8/2021 | Campbell | .......... H04B 10/0793 |
| 2019/0215248 A1* | 7/2019 | D'Ippolito | .............. H04L 41/22 |
| 2022/0376997 A1* | 11/2022 | Sinclair | ................... H04L 41/12 |
| 2024/0223272 A1* | 7/2024 | Chen | ...................... H04B 10/03 |

* cited by examiner

*Primary Examiner* — Rachel J Hackenberg

(57) ABSTRACT

Techniques for diagnosing anomalies (e.g., faults, degradation and/or loss of service) occurring in a passive optical network (PON) include integrating, based on temporal precedence, real-time diagnostic information from multiple (and typically mutually-exclusive) domains of the PON into an integrated, multi-domain graphical view. The integrated, multi-domain graphical view may include a scrolling timeline and may organize alarm and other domain-specific events, environmental data, support information, and data from other domains to detect temporal correlations between events occurring in the different domains and thereby determine sources of anomalies occurring within the PON and initiate mitigating actions. Additionally, updating the view in real-time as additional diagnostic data is generated and integrating both real time and historical data from disparate domains results in more timely and accurate diagnosis of anomalies, identification of anomaly sources, and mitigation of (re-)occurring issues within the PON.

30 Claims, 5 Drawing Sheets

_200_

_250_

_300_

320 →

Mon 24 April

| | 15:50 | 15:55 | 16:00 | 16:05 | 16:10 | 16:15 | 16:20 | 16:25 | 16:30 | 16:35 |

318 — Weather — ● Storm Warning

305 — Wireless resource management — BOOT ● , BOOT ●

308 — IP resource management — ● Session End

310 — Technical support — ● Ticket Created , ● Ticket Closed

302a — Loss of link

302b — Dying gasps

302c — Alarms

312 — Non-optical communication resource utilization — ● 90% Peak

315 — Swarm Intelligence

BOOT ●

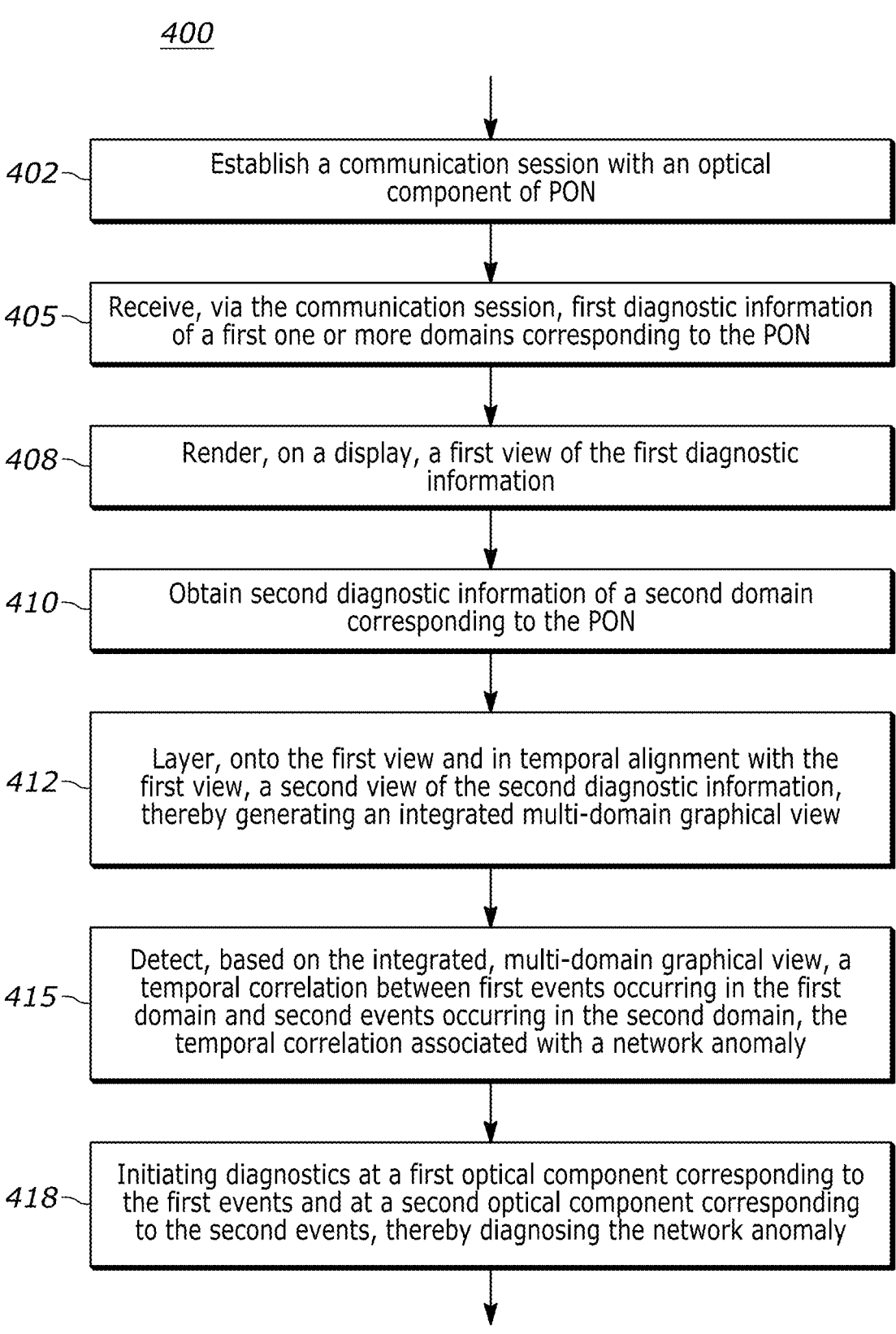

400

402 — Establish a communication session with an optical component of PON

405 — Receive, via the communication session, first diagnostic information of a first one or more domains corresponding to the PON 408 — Render, on a display, a first view of the first diagnostic information 410 — Obtain second diagnostic information of a second domain corresponding to the PON 412 — Layer, onto the first view and in temporal alignment with the first view, a second view of the second diagnostic information, thereby generating an integrated multi-domain graphical view 415 — Detect, based on the integrated, multi-domain graphical view, a temporal correlation between first events occurring in the first domain and second events occurring in the second domain, the temporal correlation associated with a network anomaly 418 — Initiating diagnostics at a first optical component corresponding to the first events and at a second optical component corresponding to the second events, thereby diagnosing the network anomaly

FIG. 4

SYSTEMS AND METHODS FOR DIAGNOSING ANOMALIES OCCURRING WITHIN A PASSIVE OPTICAL NETWORK VIA INTEGRATED DOMAINS

CROSS-REFERENCE TO RELATED APPLICATIONS

This application claims priority to U.S. Provisional Patent Application No. 63/888,979, entitled "SYSTEMS AND METHODS FOR DIAGNOSING ANOMALIES OCCURRING WITHIN A PASSIVE OPTICAL NETWORK VIA INTEGRATED DOMAINS" and filed Sep. 26, 2025, the entire disclosure of which is hereby expressly incorporated by reference herein.

This disclosure is related to U.S. patent application Ser. No. 18/636,808 filed on Apr. 16, 2024, and entitled "Method and System for Directly Connecting a PON Device to a Mobile Device to Provide Real-Time Information" and which issued as U.S. Pat. No. 12,136,944, the contents of which are hereby incorporated by reference in this disclosure in its entirety.

FIELD OF THE DISCLOSURE

This disclosure relates generally to passive optical networks (PONs), and, more particularly, to systems and methods for identifying sources of anomalies occurring within PONs based on integrated domains.

BACKGROUND

A conventional PON includes one or more optical line terminals (OLTs) at a central location connecting to one or more optical last mile termination units (LMTUs) disposed at respective customer premises (e.g., physical locations serviced by the PON) via one or more optical fibers. A PON is typically implemented using a point-to-multipoint topology in which a feeder optical fiber from an OLT serves multiple last mile termination units. An LMTU may be, for example, an optical network terminal (ONT) or an optical network unit (ONU) that is optically connected to the OLT via a respective distribution optical fiber received at the LMTU. Typically, the distribution optical fibers for respective ones of the LMTUs are optically coupled to the feeder optical fiber via a fiber distribution hub (FDH) using an optical splitter. A fiber distribution terminal (FDT) may be utilized to connect feeder optical fibers to distribution optical fibers, for example.

When a PON experiences a network anomaly or failure (e.g., equipment malfunctions, signal loss, network congestion, broken optical fibers, degradation in service, loss of service, or other undesired technical issues), the effects are typically observed by customers or end-users at locations at which last mile termination units are disposed. For example, a customer may observe a slowing down or lack of fidelity of PON services at his or her location, and may contact the PON service provider for assistance. In attempting to resolve the issue, technicians of the PON typically troubleshoot only the single optical path via which the last mile termination unit at the customer's premises receives optical services (e.g., the optical path from the OLT to the last mile termination unit at the customer's premises), and as such may frequently misdiagnose the source of the observed degradation as being the last mile termination unit disposed at the customer premises. However, the last mile termination unit may be operating properly and the source of the observed degradation may instead be elsewhere within the PON. For example, the degradation may be caused by dirty or faulty optical fibers via which the optical signals are delivered to the last mile termination unit at the customer location, by a faulty intermediate node (such as the FDH) within the PON, and/or even by faults or degradations within the OLT equipment, any of which can present as degradations observed at the last mile termination unit at the customer's premises. The technician is not able to accurately and quickly diagnose and identify these other possible sources of the anomaly, at least because alarms and events occurring within various portions of and platforms servicing the PON are typically reported and/or displayed on a per-domain (e.g., single domain) basis, which makes it difficult for technicians to synthesize the needed information to correctly identify a source of the observed anomaly. For example, typically respective alarms and events generated by different platforms which support different aspects of or which are associated with the PON (e.g., real-time operations, communications and routing infrastructure, customer support, utilization and network management, etc.) are siloed and operate independently of other platforms, thus making it even more difficult for technicians to correctly and quickly identify a source of the anomaly and resolve the issue.

SUMMARY

The systems, methods, and techniques disclosed herein generally are directed to diagnosing anomalies (e.g., faults, degradation of service, loss of service, etc.) occurring within a passive optical network (PON). The systems, methods, and techniques include integrating diagnostic information (e.g., in real-time as the diagnostic information is generated by various components of the PON) from multiple domains of the PON into an integrated, multi-domain graphical view based on temporal precedence. The integrated multi-domain graphical view may include a scrolling timeline to organize alarm and other domain-specific events, environmental data, support information, and data from other domains, thereby allowing for timely and accurate diagnosis of anomalies, identification of anomaly sources, and mitigation of (re-) occurring issues within the PON.

In an embodiment, a method of diagnosing network anomalies in a passive optical network (PON) includes establishing a communication session with an optical component included in the PON; receiving, at the client device from the optical component via the communication session, first diagnostic information of a first domain corresponding to the optical component; and rendering, on a user interface, a first view of the first diagnostic information. The first view may include graphical indications of occurrences of a first event occurring in the first domain and respective durations of the occurrences of the first event.

Additionally, the method includes obtaining second diagnostic information of a second domain related to the PON, and layering, on the first view rendered on the user interface, a second view of the second diagnostic information. The second view may include graphical indications of occurrences of a second event occurring in the second domain and respective durations of the occurrences of the second event, and the layering may include aligning respective temporal axes of the first view and the second view, thereby generating an integrated multi-domain graphical view.

Further, the method may include detecting, via the integrated multi-domain graphical view, a temporal correlation between the first events and the second events, where the temporal correlation is indicative of a network anomaly. The method may also include, responsive to the detecting, initiating respective diagnostics for each of a first optical component corresponding to the first events and a second optical component corresponding to the second events, thereby diagnosing the network anomaly.

In an embodiment, one or more non-transitory computer-readable memories store thereon computer-executable instructions that, when executed by one or more processors, cause the one or more processors to: establish a communication session with an optical component included in a passive optical network (PON); receive, from the optical component via the communication session, first diagnostic information of a first domain corresponding to the optical component; and render, on a user interface, a first view of the first diagnostic information, the first view including graphical indications of occurrences of a first event occurring in the first domain and respective durations of the occurrences of the first event.

Additionally, the computer-executable instructions may be executable to obtain second diagnostic information of a second domain related to the PON, and layer, on the first view rendered on the user interface, a second view of the second diagnostic information. The second view may include graphical indications of occurrences of a second event occurring in the second domain and respective durations of the occurrences of the second event, and the layering may thereby generate an integrated multi-domain graphical view in which temporal axes of the first view and the second view are aligned.

The computer-executable instructions may be further executable to detect, via the integrated multi-domain graphical view, a temporal correlation between the first events and the second events, the temporal correlation indicative of a network anomaly; and responsive to the detection of the temporal correlation, initiate respective diagnostics for each of a first optical component corresponding to the first events and a second optical component corresponding to the second events, thereby diagnosing the network anomaly.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

FIG. 4 is a block diagram of an example method for diagnosing a PON.

Figure 1:
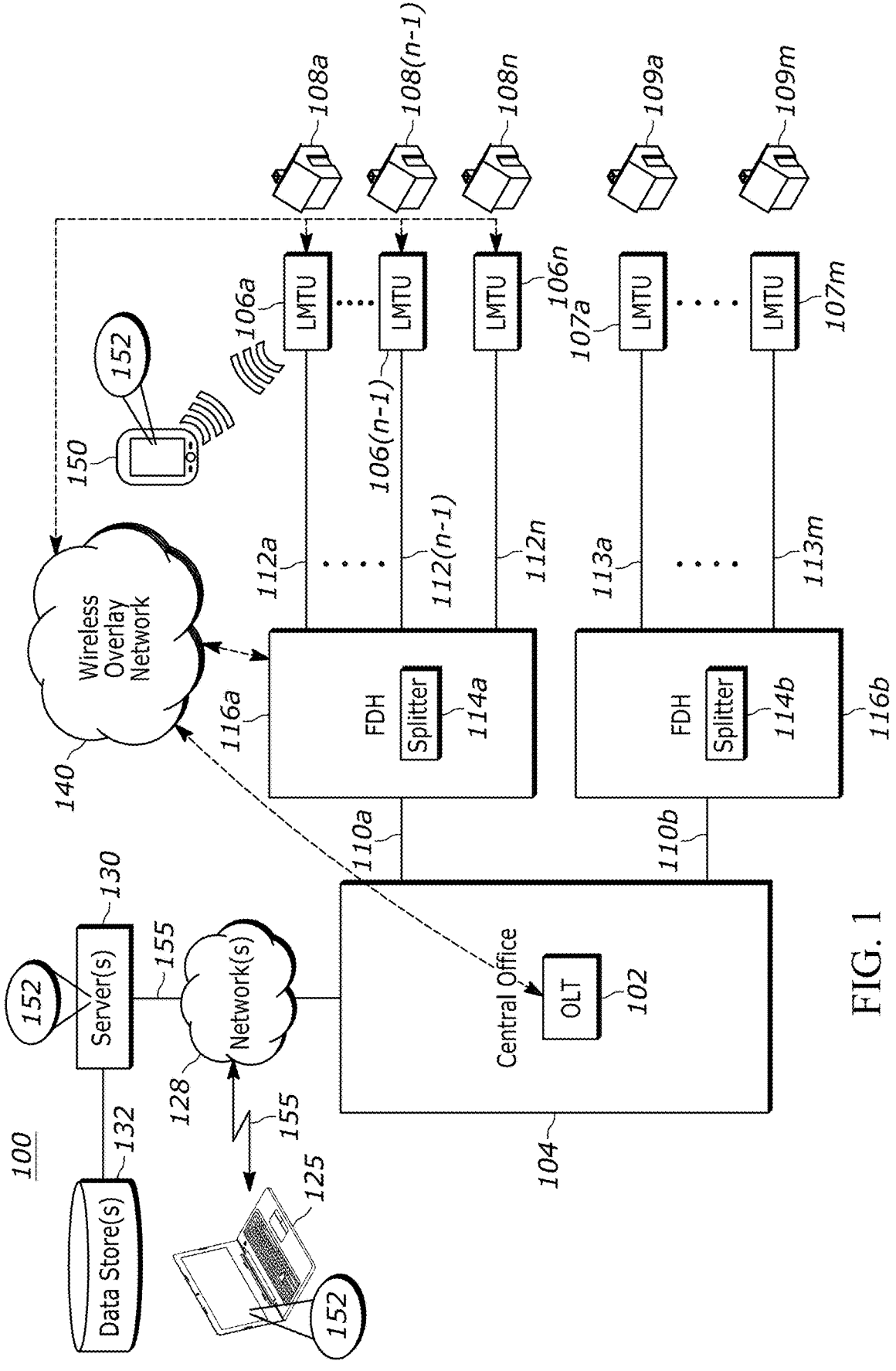
FIG. 1 is a block diagram of an example passive optical network (PON) in which the systems, methods, and/or techniques of the present disclosure may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Disclosed examples of the disclosure provide a number of advantages over existing techniques for repairing a PON. Reference will now be made in detail to non-limiting examples, some of which are illustrated in the accompanying drawings.

Example Passive Optical Network (PON)

FIG. 1 is a block diagram of an example PON 100 in which the systems, methods, and techniques of the present disclosure may be implemented. The example PON 100 includes one or more optical line terminals (OLTs) (an example one of which is designated by reference numeral 102) at a central location (e.g., at a central office 104) optically connecting to one or more last mile termination units 106a, . . . , 106n at respective customer premises 108a, . . . , 108n. The last mile termination units 106a, . . . , 106n may be located outside and/or inside the customer premises or locations 108a, . . . , 108n. Each last mile termination unit 106a, . . . , 106n may be, for example, an optical network unit (ONU) or an optical network terminal (ONT). In some examples herein, the term "optical terminal" generally refers to a last mile termination unit (e.g., an ONU or ONT) or an OLT.

The example PON 100 is implemented using instances of point-to-multipoint topology. For example, in the example PON 100, a first feeder optical fiber 110a from the OLT 102 (which is interchangeably referred to herein as an "F1 optical fiber 110a" or a "primary optical fiber 110a") serves the one or more last mile termination units 106a, . . . , 106n via respective distribution optical fibers 112a, . . . , 112n (which are interchangeably referred to herein as "F2 optical fibers 112a, . . . , 112n" or "secondary optical fibers 112a, . . . , 112n"). In the illustrated example, the first feeder optical fiber 110a is optically coupled to the plurality of last mile termination units 106a, . . . , 106n via an example one-to-many optical splitter 114a which is disposed, located, implemented, etc. in an example fiber distribution hub (FDH) 116a. In some arrangements, the FDH 116a is located within a geographic area (e.g., a neighborhood) such that the customer premises 108a, . . . , 108n are proximally close to the FDH 116a, and typically each of the customer premises 108a, . . . , 108n and respective last mile termination units 106a, . . . , 106n is disposed at a different optical distance from the FDH 116a. An "optical distance," as generally utilized herein, refers to a distance over which an optical signal travels.

In embodiments, the PON 100 may or may not include additional feeder optical fibers and optical splitters for a plurality of additional customer premises. Moreover, a PON may or may not include a plurality of FDHs. For example, as shown in FIG. 1, the example PON 100 includes a second feeder or primary optical fiber 110b from the OLT 102 that is optically coupled to another plurality of last mile termination units 107a-107m at respective customer premises 109a-109m via another many-to-one optical splitter 114b included in another fiber distribution hub 116b and via respective secondary optical fibers 113a-113m.

As utilized herein, the "components" of the PON 100 generally refer to the devices, nodes, and optical fibers of the PON 100. For example, the components of the PON 100 shown in FIG. 1 may include the OLT 102, the FDHs 116a, 116b, the splitters 114a, 114b, the LMTUs 106a-106n and 107a-107m, and the optical fibers interconnecting the devices or nodes, e.g., the optical fibers 110a-110b, 112a-112n, and 113a-113m.

In some scenarios, an optical terminal (e.g., the OLT 102 and/or one or more the last mile termination units 106a-106n, 107a-107m) communicates with a computing device. For example, the OLT 102 and/or the one or more LMTUs 106a-106n, 107a-107m may transmit or receive data from a computing device 125 (e.g., a laptop, a computer, a tablet, a mobile phone, etc.) associated with a service technician or other agent of the PON 100 or a computing device associated with a customer. The computing device 125 may include one or more processor(s) and one or more memories storing machine-readable or computer-executable instructions executable on the processor(s). The processor(s) may include one or more general-purpose processors (e.g., CPUs), and/or special-purpose processing units (e.g., graphical processing units (GPUs)). The one or more memories may be one or more non-transitory, tangible memories and can include one or several suitable memory modules, such as random access memory (RAM), read-only memory (ROM), flash memory, other types of persistent memory, etc.

In some examples, the computing device 125 communicates with an LMTU 106a-106n, 107a-107m via one or more networks 128 (which may include one or more wired, optical, and/or wireless private networks and/or public networks (such as the Internet), one or more physical and/or logical services platforms (such as cloud-based services platforms), etc.). In other examples, a client computing device 150 (also referred to herein as a "client device") communicates directly with the LMTU 106a-106n, 107a-107m by establishing a communication session with the LMTU 106a-106n, 107a-107m over a short-range communication link, such as Bluetooth, Wi-Fi, or near field communication (NFC). The client device 150 may also be associated with a service technician, other agent of the PON 100, or a customer. Then during the communication session, the client device 150 and the LMTU 106a-106n, 107a-107m may directly transmit information back and forth to each other. For example, the LMTU 106a-106n, 107a-107m may transmit diagnostic information to the client device 150 which may be presented on a user interface of the client device 150 via a PON repair application. The client device 150 may transmit control signals to the LMTU 106a-106n, 107a-107m for the LMTU 106a-106n, 107a-107m to perform diagnostic tests, such as a dial tone test or a speed test.

The client device 150 may be a portable device such as a smart phone or a tablet computer, for example. The client device 150 may also be a laptop computer, a desktop computer, a personal digital assistant (PDA), a wearable device such as a smart watch or smart glasses, a virtual reality headset, etc.

The client device 150 may include one or more processor(s) and one or more memories storing machine-readable or computer-executable instructions executable on the processor(s). The processor(s) may include one or more general-purpose processors (e.g., CPUs), and/or special-purpose processing units (e.g., graphical processing units (GPUs)). The one or more memories may be one or more non-transitory, tangible memories and can include one or several suitable memory modules, such as random access memory (RAM), read-only memory (ROM), flash memory, other types of persistent memory, etc. The one or more memories may store instructions for implementing a PON diagnostic and repair application 152 for directly connecting to an LMTU 106a-106n, 107a-107m and establishing a communication session with the LMTU 106a-106n, 107a-107m to receive diagnostic information for identifying the cause of a network failure. The PON diagnostic and repair application 152 may also provide information for diagnosing issues associated with the LMTU 106a-107n, 107a-107m, instructions for repairing the LMTU 106a-106n, 107a-107m and/or other optical components of the PON, in some cases by presenting graphical indications. In some embodiments, an instance of the PON diagnostic and repair application 152 may additionally or alternatively execute on the back-end computing device 125 and/or on one or more back end servers 130. That is, an instance of the PON diagnostic and repair application 152 may be stored on one or more non-transitory computer-readable memories of the computing device 125 and/or of the back-end servers 130, and the stored instance 152 may be executed by one or more processors of the computing device 125 and/or of the back-end servers 130.

Additionally, the client device 150 may include sensors, such as a positioning sensor (e.g., a Global Positioning System (GPS)), an accelerometer, an infrared sensor, a camera, a depth sensor such as a light detection and ranging (lidar) sensor, an electromagnetic sensor, etc. The client device 150 may also include a network interface for communicating with devices over short-range communication links, such as Bluetooth, Wi-Fi, or NFC. The network interface may enable communication with other devices (e.g., the OLT 102, the last mile termination units 106a, 106n, the one or more servers 130, the computing device 125, etc.) via any suitable networks such as the PON 100 and/or the network(s) 128. The example network interfaces include any suitable type of communication interface(s) (e.g., wired and/or wireless interfaces) configured to operate in accordance with any suitable communication protocol(s). Example network interfaces include a TCP/IP interface, a WiFi™ transceiver (e.g., according to the IEEE 802.11x family of standards), an Ethernet transceiver, a cellular transceiver, a satellite transceiver, an asynchronous transfer mode (ATM) transceiver, a digital subscriber line (DSL) modem, a coaxial cable modem, a dialup modem, or any other suitable interface based on any other suitable communication protocols or standards.

Furthermore, the client device 150 may include a display. The display may be a transparent display with camera views of real-world imagery. For example, when the client device 150 is smart glasses or a virtual reality headset, the transparent display may be presented in front of the user's eyes. Then the client device 150 may present augmented reality features on the transparent display overlaying the real-world imagery to help guide the user.

Additionally and/or alternatively, the client device 150 or an optical terminal in the PON 100 may communicate with one or more servers 130 of the PON 100 that are used to manage the PON 100, the network(s) 128, etc. For example, the one or more servers 130 (in some instances, in conjunction with the back-end computing device 125) may schedule and execute diagnostics of various components of the PON 100 and/or of the PON 100 as a whole, generate alerts and alarms, initiate various actions, provide user interfaces, which may include graphical user interfaces (e.g., at the computing device 125), log, historize, and/or otherwise store data generated by and associated with the PON 100 (e.g., in one or more data stores 132), and the like. For example, one or more applications (such as the PON diagnostic and repair application 152) may execute at the server(s) 130 and/or the server(s) may host one or more services to provide management, administrative, and/or test functionalities of the PON 100.

In another example, the PON diagnostic and repair application 152 may communicate with the server(s) 130 to transmit diagnostic information to the server(s), receive repair instructions from the server(s) 130, receive a description of an identified root cause of the network failure from the server(s), etc. In some implementations, the entire functionality of the PON diagnostic and repair application 152 may be executed on the server(s) 130 and/or on the back-end computing device 125. In other implementations, the PON diagnostic and repair application 152 does not communicate with a server 130 and performs its functionality locally on the client device 150. In yet other implementations, the client device 150 or the back-end computing device 125 and the server(s) 130 each perform a portion of functionality of the PON diagnostic and repair application 152.

Various information and data associated with, utilized by, and/or generated by the PON 100 may be stored in the data stores 132 of the PON 100. For example, the data store(s) 132 may store sets of instructions for repairing LMTUs 106a-106n, 107a-107m, where each set of instructions corresponds to a different root cause of the network failure. For example, if the root cause is a broken optical fiber 112a, the corresponding instructions may be for replacing the optical fiber 112a. If the root cause is that the optical fiber 112a is dirty, the corresponding instructions may be for cleaning the optical fiber 112a. The data store(s) 132 may also store records of customer contact events with a technical support organization supporting the PON 100, service call records, records of operating conditions and events which occurred, logbooks, and the like.

Additionally, the data store(s) 132 may store applications which may execute at the one or more servers 130, and/or which may be downloaded or otherwise provided to the technician computing device 125 for installation and execution thereon. Further, the data store(s) 132 may store data indicative of performance, faults, diagnostics, statuses, states, and/or other data corresponding to the components of the system 100. Still further, the data store(s) 132 may store data indicative of the architecture, infrastructure, and component connectivity of the PON 100, including identifications of various PON components and indications of which PON components connect to which other PON components. Of course, the data store(s) 132 may store any updates to any and all of the information and data stored therein.

The example servers 130, optical terminals (e.g., any of the OLT 102, the last mile termination units 106a, 106n), and/or the example computing devices 125, 150 may include a respective processing platform capable of executing instructions to, for example, implement operations of the example methods described herein, as may be represented by the flowcharts of the drawings that accompany this description. Other example logic circuits capable of, for example, implementing operations of the example methods described herein include a field programmable gate array (FPGA), an application specific integrated circuit (ASIC), a programmable logic device (PLD), and a field programmable logic device (FPLD). The processing platform may be, for example, one or more servers, a cloud computing system, a computer, a workstation, a laptop, a mobile device (e.g., a cell phone, a smart phone, a tablet such as an IPAD™), or any other type of computing device or system. For example, in some embodiments, at least portion the servers 130, at least a portion of the data stores 132, the PON diagnostic and repair application 152, and/or any other applications or services provided by the servers 130 may be implemented on one or more cloud computing or cloud services platforms.

The example processing platform includes one or more processors, one or more memories, one or more network interfaces, one or more input/output (I/O) interfaces, and/or a set of data stores, all of which are interconnected via one or more address/data bus or communication links.

The processors may be implemented using hardware, and may include a semiconductor based (e.g., silicon-based) device. The processors may be, for example, one or more programmable microprocessors, controllers, digital signal processors (DSP), graphics processing units (GPU) and/or any suitable type of programmable processor capable of executing instructions to, for example, implement operations of the example methods described herein. Additionally and/or alternatively, the processors may be a field programmable gate array (FPGA), an application specific integrated circuit (ASIC), etc. that implements operations of the example methods described herein without executing instructions.

The memories are accessible by the processors (e.g., via a memory controller). The example processors interact with the memories to obtain, for example, machine-readable instructions stored in the memories corresponding to, for example, the operations represented by the flowcharts of this disclosure. The example processors may also interact with the memories to store data, such as data formed or used during execution of machine-readable instructions. Example memories include any number and/or type(s) of volatile or non-volatile, non-transitory, machine-readable storage medium, devices or disks, such as a semiconductor memory, magnetically readable memory, optically readable memory, biologically readable memory, a hard disk drive (HDD), a solid-state drive (SSD), a read-only memory (ROM), a random-access memory (RAM), a redundant array of independent disks (RAID) system, a cache, flash memory, or any other storage medium, device or disk in which information may be stored for any duration (e.g., permanently, for an extended time period, for a brief instance, for temporarily buffering, for caching of the information, etc.). Additionally and/or alternatively, machine-readable instructions corresponding to the example operations described herein may be stored on one or more volatile or non-volatile, non-transitory, machine-readable removable storage media (e.g., a compact disc (CD), digital versatile disk (DVD), Blu-ray disk, removable flash memory, etc.) that may be coupled to the processing platform to provide access to the machine-readable instructions stored thereon.

The example processing platform includes one or more communication interfaces such as, for example, the one or more network interfaces, and/or the one or more input/output (I/O) interfaces. The communication interface(s) enable the processing platform to communicate with, for example, another device, system, etc. (e.g., the OLT 102, the last mile termination units 106a, 106n, the one or more servers 130, the computing device 125, the one or more data stores 132, etc., any other database, and/or any other machine).

The example processing platform includes the network interface(s) to enable communication with other machines (e.g., the OLT 102, the last mile termination units 106*a*, 106*n*, the one or more servers 130, the computing device 125, etc.) via, for example, one or more networks such as the PON 100 and/or the network(s) 128. The example network interfaces include any suitable type of communication interface(s) (e.g., wired and/or wireless interfaces) configured to operate in accordance with any suitable communication protocol(s). Example network interfaces include a TCP/IP interface, a WiFi™ transceiver (e.g., according to the IEEE 802.11x family of standards), an Ethernet transceiver, a cellular transceiver, a satellite transceiver, an asynchronous transfer mode (ATM) transceiver, a digital subscriber line (DSL) modem, a coaxial cable modem, a dialup modem, or any other suitable interface based on any other suitable communication protocols or standards.

The example, processing platform includes the input/ output (I/O) interface(s) (e.g., a Bluetooth® interface, a near-field communication (NFC) interface, a universal serial bus (USB) interface, a serial interface, an infrared interface, a PCI express interface, etc.) to enable the processors to communicate with peripheral I/O devices and/or other communication systems. For example, the I/O interface(s) may be used to control a light source, enable receipt of user input (e.g., from a touch screen, a keyboard, a navigation device such as mouse, touch pad, joystick or trackball, a microphone, a button, etc.) and communicate output data (e.g., visual indicators, instructions, data, images, etc.) to the user (e.g., via a display, a speaker, a printer, a communication interface, an antenna, etc.). The I/O interface(s) typically include a graphics driver card, graphics driver chip and/or graphics driver processor to drive a display when a display is present.

In some examples, the processing platform also includes, or is otherwise communicatively coupled to, a set of data stores or other data storage mechanisms (one or more of a HDD, optical storage drive, solid state storage device, CD, CD-ROM, DVD, Blu-ray disk, RAID, data storage bank, etc.). The set of data stores may include the example data stores 132.

In some embodiments, the PON 100 may include a wireless overlay network 140 that includes a plurality of wireless nodes. Generally speaking, the wireless overlay network 140 serves as a logical signaling channel, pathway, or means of delivering optical node statuses (e.g., statuses of optical connectivity of optical nodes) and information pertaining to the components and operations of the passive optical network 100 to the one or more servers 130, and in particular when portions of the PON 100 are compromised or not available. As such, the wireless overlay network 140 may be communicatively connected (e.g., in wired and/or wireless manners) to the one or more servers 130 of the PON system 100, e.g., directly and/or via the network(s) 128.

The plurality of wireless nodes included in the wireless overlay network 140 may include, for example, one or more optical components of the PON 100 (such as one or more LMTUs 106-106*n*, FDH 116*a*, and OLT 102, etc.) and may include one or more wireless nodes which are not optical components (e.g., gateways, routers, extenders, access points, etc., not shown in FIG. 1). Each wireless node of the wireless network 140 includes or is coupled to one or more wireless transceivers which may support one or more wireless communication protocols, standards, and/or frequency bands such as, for example, short-range wireless protocols (e.g., Zigbee®, Bluetooth®, Wi-Fi®, and/or other short-range wireless protocols); VHF and UHF bands spanning 54 to 900 MHz; higher RF (radio frequency) bands such as the 2.4 GHz, 4.9 GHZ, 5G, 6G, and 60 GHz frequency bands; IEEE 802.11af and 802.11ah compliant protocols for TV White Space communication; etc. Some wireless nodes of the network 140 may be unitary, physical wireless nodes in which one or more wireless transceivers are integrally included in a single physical device. Some wireless nodes may be unitary, logical wireless nodes in which one or more wireless transceivers are communicatively connected to a physical device, and the combination of the physical device and the communicatively connected wireless transceiver(s) operates and is identified as a single, logical wireless node within the wireless network 140. In some embodiments, at least some of the wireless nodes of the wireless network 140 may include or may be communicatively connected to software-defined radios (SDRs) that dynamically self-configure and/or are dynamically configured to utilize one or more wireless communication protocols, standards, and/or frequency bands supported by at least portions of the wireless network 140.

A user may connect the client device 150 and an LMTU 106*a* to establish a communication session between the client device 150 and the LMTU 106*a* and/or between the PON diagnostic and repair application 152 and the LMTU 106*a*. For example, a user may tap the client device 150 to the LMTU 106*a* to cause the PON diagnostic and repair application 152 to transmit a wireless signal to the LMTU 106*a* requesting to pair the devices and establish a communication session between the two devices 150, 106*a* in response to the request. The wireless signal may utilize any suitable wireless technology, such as short-range wireless technology (e.g., Near Field Communication (NFC), Bluetooth®, etc.), wireless networking technology (e.g., Wireless Fidelity (Wi-Fi®), etc.), and the like. In some implementations, the PON diagnostic and repair application 152 may also connect to and/or receive navigation information to other optical components of the PON, such as an FDH 116*a*, FDT, or OLT 102.

Figure 2A:
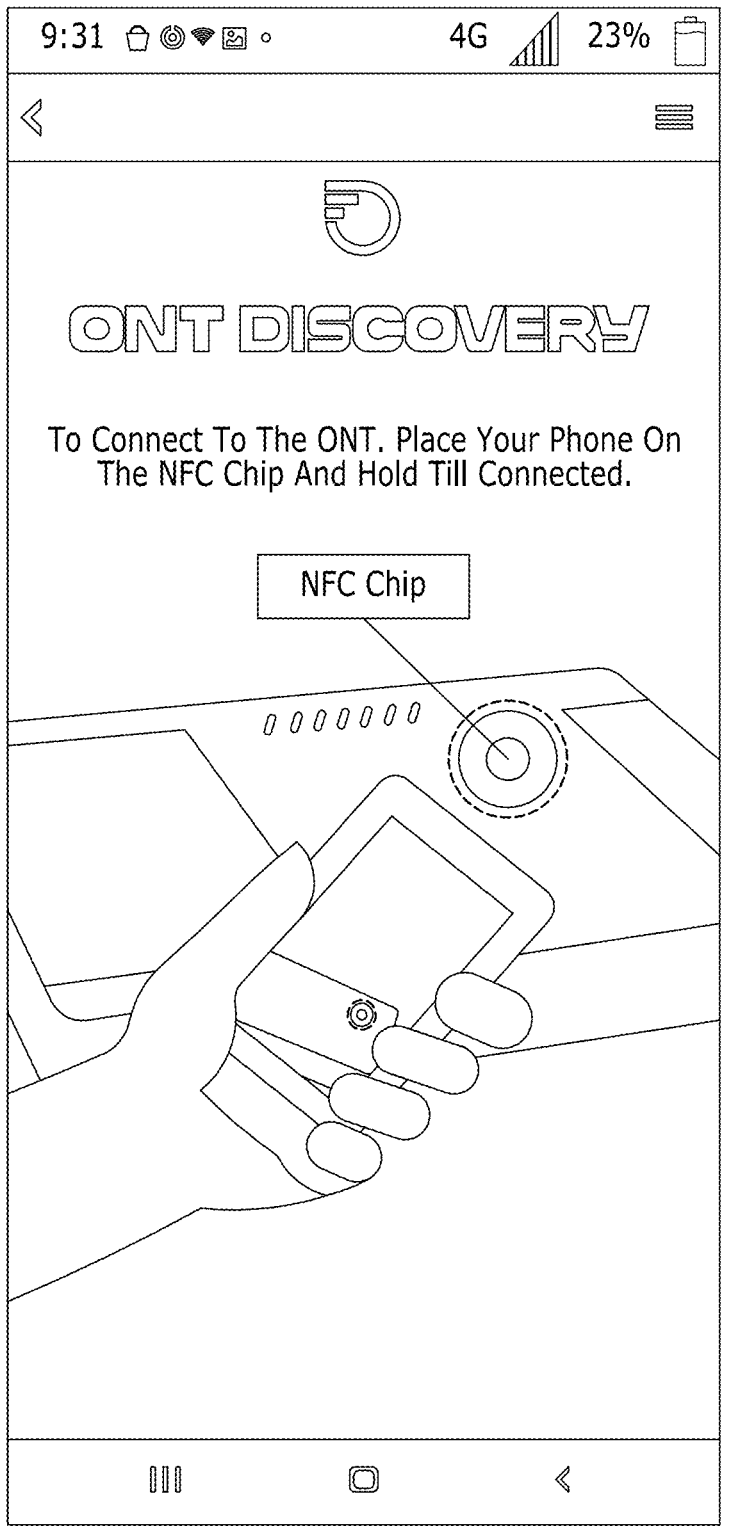
FIGS. 2A and 2B illustrate example displays of a PON diagnostic and repair application, which may be presented on a client device.
Figure 2B:
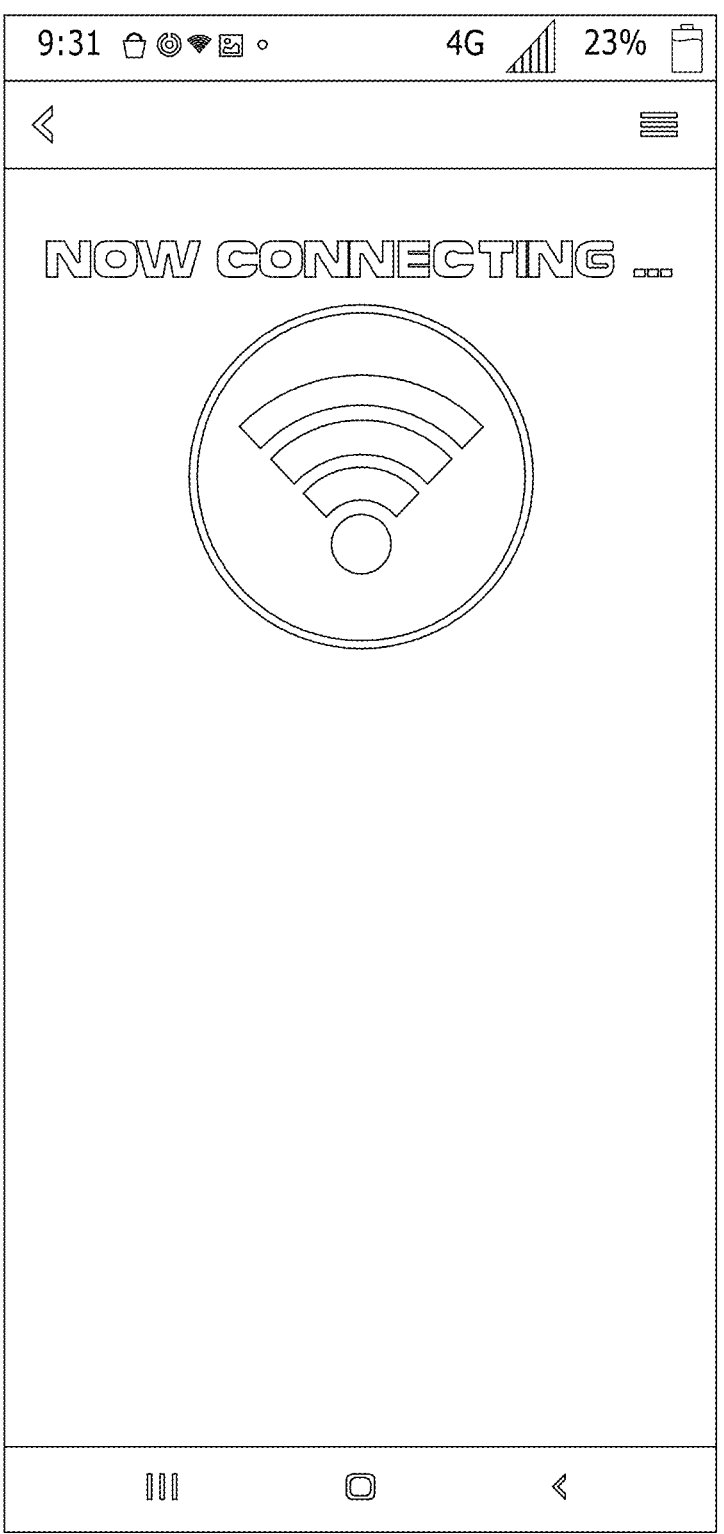
Figure 3:
FIG. 3 illustrates an example display of a PON diagnostic and repair application, which may be presented on a client device.

FIGS. 2A-2B and FIG. 3 respectively illustrate example displays 200, 250, 300 for connecting to an ONT or other optical component, where the example displays 200, 250, 300 may be presented by the PON diagnostic and repair application 152 on the client device 150. The screenshots shown in FIGS. 2A-2B and FIG. 3 are examples of what may be displayed to an user. As will be appreciated by those of ordinary skill in the relevant art(s), the exemplary screenshots shown in FIGS. 2A-2B and FIG. 3 are for illustrative purposes, and they may be presented by the PON diagnostic and repair application 152 on the computing device 125 and/or at a user interface associated with the server 130. Additionally, the associated functionality of the example displays 200, 250 may be implemented using any suitable format and/or design for facilitating their corresponding described functionalities without departing from the spirit and scope of the present disclosure. Further, FIGS. 2A-2B and FIG. 3 are described below with simultaneous reference to FIG. 1 for purposes of clarity of discussion, and not for limitation purposes.

As shown in FIGS. 2A and 2B, the PON diagnostic and repair application 152 may present a display 200 with instructions for wirelessly connecting to a client device (e.g., client device 150) an LMTU 106*a*, e.g., by using NFC. The display 200 of FIG. 2A includes instructions for connecting to the LMTU 106*a* by tapping the client device 150 to an NFC chip on the LMTU 106a, for example. Then once the user taps the client device 150 to the LMTU 106a, the PON diagnostic and repair application 152 may present a display 250 indicating the client device 150 is connecting to the LMTU 106a. The client device 150 may then pair with the LMTU 106a and establish a communication session between the devices 150, 106a. In some embodiments, pairing may include authenticating and/or authorizing the client device 150.

Additionally or alternatively, the client device 150 may connect to the LMTU 106a using a Wi-Fi communication link and/or another suitable type of short-range communication link. At any rate, after the client device 150 successfully connects to the LMTU 106a via a short-range communication link, the PON diagnostic and repair application 152 may receive and present diagnostic information related to multiple domains of the PON 100, such as shown in the diagnostic display 300 of FIG. 3.

In some embodiments (not shown), the PON diagnostic and repair application 152 may execute at back-end computing device 125 and/or at the servers 130, which are disposed remotely from the LMTU 106a. In the embodiments, the PON diagnostic and repair application 152 may communicatively connect to the LMTU 106a via one or more networks, which may include one or more wireless, wired, and/or optical networks. Referring to FIG. 1 to illustrate, the PON diagnostic and repair application 152 and or the device 125/130 on which the PON diagnostic and repair application 152 is executing may establish a communication session with the LMTU 106a via one or more wireless and/or wired connections 155, the networks 128, and/or any one or more of the optical links 110a, 112a. For example, in some embodiments, the communication session may be established at least partly over optical links 110a, 112a, and in other embodiments the communication session may not be established over any optical links 110a, 112a of the PON 100, but instead may be established over a wireless mesh network 140 which is overlaid on and supports the PON 100, such as the wireless mesh networks described in U.S. patent application Ser. Nos. 18/637,407, 18/637,414, and 18/637/420, the disclosures of which are hereby incorporated by reference in their entireties.

Additionally, and similar to that discussed above with respect to the proximally-disposed client device 150, the instance of the PON diagnostic and repair application 152 and/or the remotely-disposed device 125/130 on which the instance of the PON diagnostic and repair application 152 is executing may be authorized and authenticated to communicate with the LMTU 106a, and/or vice versa. At any rate, after the PON diagnostic and repair application 152 and or the device 125/130 on which the PON diagnostic and repair application 152 is executing successfully establishes a communication session with the LMTU 106a via the one or more network links, the PON diagnostic and repair application 152 may receive and present diagnostic information related to multiple domains of the PON 100, such as shown in the diagnostic display 300 of FIG. 3.

Turning now to FIG. 3, FIG. 3 illustrates an example diagnostic display 300 which may be presented by the PON diagnostic and repair application 152 on a user interface of the client device 150, the back-end computing device 152, or the one or more servers 130. As shown in FIG. 3, the diagnostic display 300 presents respective diagnostic information from nine example domains 302-318 associated with the PON 100. It is understood, though, that the domains 302-318 illustrated in FIG. 3 are exemplary in number and type and, in embodiments, the display 300 may include additional or alternate numbers and/or types of domains. Typically, but not necessarily, the domains are mutually exclusive domains, each of which is related to the PON 100. Generally speaking, the display 300 presents integrated diagnostic information from at least two domains, and the integrated diagnostic information may include real-time diagnostic information, e.g., diagnostic information which is obtained by the PON diagnostic and repair application 152 as the diagnostic information is generated in real-time. The integrated diagnostic information may be used by the PON 100 system and/or may assist a user in determining or identifying sources of anomalies occurring within the PON 100 and, in some cases, determining how to mitigate such anomalies (e.g., via repair, replacement, changes to settings, parameter values, and/or configurations, etc.).

A "network anomaly," or "anomaly," as interchangeably utilized herein, generally refers to a condition which deviates from (e.g., is inconsistent with or a departure from) normal, expected, or standard behavior of the PON 100, such as a degradation in an optical service or a loss of the optical service. A network anomaly may be a discrete event or may continually occur (e.g., continuously or repeatedly) over an interval of time. A network anomaly may affect the service of a single customer of the PON or may affect the service of a group of customers of the PON. A user (e.g., an agent of the PON) may utilize the display 300 provided by the PON diagnostic and repair application 152 (e.g., while on-site at a reporting customer's service location, at a physical location at which optical components of the PON 100 are disposed, or remotely) to diagnose reported or detected anomalies of the PON 100 and initiate corresponding mitigating actions.

For example, the PON diagnostic and repair application 152 may receive, via an established communication session and/or communication link, diagnostic information 302 from the LMTU 106a or from another optical component of the PON 100, such as from another LMTU 106, 107, an FDH 116a, an FDT, or an OLT 102. For ease of illustration and not for limitation purposes, though, FIG. 3 is described herein with the PON diagnostic and repair application 152 receiving the diagnostic information 302 from the LMTU 106a, although it is understood that the concepts and techniques discussed with respect to FIG. 3 can easily be applied to the PON diagnostic and repair application 152 receiving the diagnostic information 302 from other optical components of the PON 100.

The diagnostic information 302 received from the LMTU 106a may include information indicative of events occurring at, pertaining to, and/or observed by the LMTU 106a. In some situations, the diagnostic information 302 obtained by the PON diagnostic and repair application 152 from the LMTU 106a may additionally or alternatively include diagnostic information 302 indicative of events occurring at, pertaining to, and/or observed by an optical component other than the LMTU 106a. For example, another optical component such as the LMTU 106(*n*−1) may transmit, to the LMTU 106a (e.g., via a wireless link or wireless mesh network 140 supporting the PON 100), diagnostic information indicative of events occurring at, pertaining to, and/or observed by the LMTU 106(*n*−1), and such diagnostic information associated with the LMTU 106(*n*−1) may be obtained by the PON diagnostic and repair application 152 from the LMTU 106a. The obtained diagnostic information may include respective time stamps or indications of the respective times at which the diagnostic information was generated or otherwise detected. As such, the diagnostic information obtained from the different domains may include time-series or temporal diagnostic information. Additionally, the obtained diagnostic information may include an indication of the optical component (e.g., the LMTU 106a, the LMTU 106(n–1), etc.) which detected the occurrence of the domain event.

As shown in FIG. 3, the diagnostic information 302 obtained from the LMTU 106a can include indications of events of different domains which are occurring (e.g., in real-time) at the LMTU 106a and/or at another optical component. Such different domains may include loss of link 302a, dying gasps 302b, alarms 302c, bit error rate thresholds, standard deviations from historical values, changes in normal operating values above respective thresholds, events affecting services, and/or other types of domains (not shown). Generally speaking, a loss of link 302a event is indicative of the lack of detection, by a serviced optical component (e.g., the LMTU 106a), of a servicing optical link (e.g., the optical link 112a) to which the serviced component is directly and optically connected, and/or of a condition in which the servicing optical link is detected by the serviced optical component but is unable to provide services to the serviced component. A dying gasp 302b event refers to an optical component (e.g., the LMTU 106a) transmitting a signal (e.g., via the optical link 112a, a wireless link or a wireless mesh network 140, etc.) when an out-of-service state of the optical component is imminent (e.g., immediately preceding the occurrence of an out-of-service state of the optical component), such as when the gasping optical component loses power or otherwise is about to go off-line. An alarm 302c event generally refers to the occurrence of an alarm or alert condition detected at or by an optical component (e.g., the LMTU 106a), and the alarm or alert condition may or may not be occurring at the detecting optical component itself.

Of course, although FIG. 3 illustrates the diagnostic information 302 as including loss of link events 302a, dying gasp events 302b, and alarm events 302c, diagnostic information 302 of other domains may be additionally or alternatively obtained by the PON diagnostic and repair application 152 from the LMTU 106a. For example, other domains of the received diagnostic information 302 may include operational statuses of the LMTU 106a or subject optical component, download rates at the LMTU 106a or subject optical component, upload rates at the LMTU 106a or subject optical component, light level metrics at the LMTU 106a or subject optical component, a distance from the LMTU 106a or subject optical component to the OLT 102, temperature metrics at the LMTU 106a or subject optical component, PON utilization metrics, uplink metrics for the LMTU 106a or subject optical component, results of one or more tests (e.g., speed tests, tone tests, etc.), or any other suitable diagnostic information related to the LMTU 106a or subject optical component and/or related to the PON 100.

It is noted that although the display 300 illustrates domain-specific information 302 obtained from a single optical component, e.g., the LMTU 106a, in embodiments, the display 300 may include respective domain-specific information 302 from multiple optical components, which may be of the same or different types of optical components. In some embodiments, the display 300 may include respective domain-specific information 302 received from all optical components which are physically located in a certain geographical area, are connected to a specific central office, of are a same device type and/or model, etc. Indeed, in some embodiments, all optical components of the PON 100 may be represented on the display 300. In some embodiments, a user may select the categories and/or characteristics of optical components whose diagnostic information 302 is to be included in the display 300.

Additionally, the PON diagnostic and repair application 152 may receive information indicative of events occurring in one or more other domains 305-318, which may or may not pertain to the LMTU 106a. The domain-specific diagnostic information 305-318 may be obtained by the PON diagnostic and repair application 152 from a respective server (e.g., the server 130 and/or other servers) at which the domain-specific diagnostic information 305-318 is collected (e.g., from respective domain-specific sensors) and maintained (e.g., at data stores 132 and/or other data stores). Typically, but not necessarily, the different domains 305-318 are mutually exclusive domains. Accordingly, typically, but not necessarily, the domain-specific servers are siloed from (e.g., implemented independently of) other domain-specific servers, e.g., via separate hardware and/or software, access control, and/or other techniques. As such, the PON diagnostic and repair application 152 may establish a respective communication session with each of the domain-specific servers over one or more communication links (e.g., via the wireless mesh network 140, via optical links within the PON network 100, via the network(s) 128, etc.), and the domain-specific information 302-318 may be obtained by the PON diagnostic and repair application 152 via the communication sessions and/or communication links.

As shown in FIG. 3, an example domain 305 may be provided by a system for managing and supporting wireless resources included in and/or corresponding to the PON 100. Such a wireless resource management system may manage, for example, the wireless mesh network 140, wireless nodes thereof, and other wireless transceivers or devices included in, related to, and/or otherwise associated with the PON 100 (e.g., access points, routers, gateways, and the like). Accordingly, the domain-specific diagnostic information provided by the wireless resource management system may include data indicative of various events occurring within the managed PON wireless resources such as re-boots, faults, bandwidth, quality of service, and/or other types of events generated during the operations of wireless networks and/or resources. Each type of wireless resource event may be included in its own domain, or may be combined with other types of events detected by the wireless resource management system in the domain 305.

Another example domain 308 shown in FIG. 3 may be provided by a system for managing and supporting Internet Protocol (IP) resources (e.g., IP addresses, sessions, etc.) utilized within the PON 100. The IP resource management system may provide domain-specific diagnostic information indicative of various events related to the management of IP resources, such as when a device obtains an IP address to identify the device (e.g., within the PON 100), when an identifying IP address is no longer associated with a device, when sessions start and stop, and the like. Each type of IP resource-related event may be included in its own domain, or may be combined with other types of events detected by the IP resource management system in the domain 308.

Yet another example domain 310 shown in FIG. 3 may be provided by a technical support system of the PON 100. The technical support system may provide domain-specific diagnostic information indicative of various events related to technical support of the PON 100, such as customer calls associated with various optical components of the PON, trouble ticket creations and closures, technician dispatches, and the like. Each type of technical support-related event may be included in its own domain, or may be combined with other types of events detected by the technical support system in the domain 310.

Still another example domain 312 shown in FIG. 3 may be provided by a system which tracks utilization of non-optical communication resources within the PON 100. Such non-optical resources can include, for example, wired and/or wireless Ethernet links, and/or other types of communication links within the PON 100 which do not use optical technology. The utilization-tracking system resources may provide domain-specific diagnostic information indicative of various events and/or conditions related to utilization of non-optical resources, e.g., on a per-link and/or aggregate basis, such as traffic utilization, bandwidth utilization, CPU (central processing unit) utilization, and the like. Each type of utilization event may be included in its own domain, or may be combined with other types of events detected by the utilization-tracking system in the domain 312.

Another example domain 315 shown in FIG. 3 may be provided by a system which determines and tracks overall working states of the PON 100, e.g., as a whole, over time, etc. Such systems may utilize swarm intelligence techniques (e.g., based on analysis of an aggregation of data provided by a multiplicity of optical and other types of components of the PON 100) to determine an aggregate working state of the PON 100 (and/or of a portion thereof) and/or other aggregate characteristics of the PON 100 (and/or of a portion thereof) over time. Such a swarm intelligence system may provide domain-specific diagnostic information indicative of various events and/or conditions related to PON working states and characteristics at an aggregated or collective level, such when different working states are entered into or exited from by the PON, as well as other characteristics of the PON 100 which are aggregated over multiple PON components (or even at an entire network level) and/or over time, such as optical fiber drift over time, optical component drift over time, light levels over time, etc. Each type of event detected by the PON swarm intelligence system may be included in its own domain, or may be combined with other types of events detected by the PON swarm intelligence system in the domain 315.

Some domains which are integrated into the display 300 may be domains which are not specific to the PON 100 but nonetheless may affect PON real-time operations. An example of such a domain 318 may be provided by a weather-tracking system, which typically may be provided by a third-party. For example, the PON diagnostic and repair application 152 may communicatively connect to a third-party weather tracking system (e.g., via the networks 128) to obtain domain-specific diagnostic information indicative of various predicted and/or detected weather events and/or conditions to which the PON 100 (and/or a portion thereof) is subjected, and/or the PON diagnostic and repair application 152 may obtain at least some types of weather-related diagnostic information from sensors (e.g., temperature sensors, humidity sensors, etc.) which are included in the client device 150 and/or the LMTU 106a or other PON optical component. Each type of weather-related event may be included in its own domain, or may be combined with other types of events detected by the weather-tracking system or sensors in the domain 318. Of course, other third-party domains in addition to and/or other than weather may be integrated into the display 300. Such third-party domains may include other domains corresponding to various types of environmental conditions, and/or any domain corresponding to the real-time operations and/or physical location of the PON 100 and/or of its components.

As shown in FIG. 3, the display 300 may scale and align the domain-specific diagnostic information of each domain 302-318 based on time. Thus, the x-axis 320 of the display 300 is presented in units of time and the indicators of domain-specific event occurrences in each of the domains 302-318 is indicative of a start time, a duration, and an end time of the respective domain-specific event. Further, the scaled and aligned domain-specific information is presented in a layered manner on the display 300, so that time correlations between different events occurring in different domains (e.g., overlaps, timing of starts and stops of different occurrences, frequencies of occurrences, etc.) can be easily detected and identified, e.g., in a visual manner. As such, the display 300 integrates the disparate diagnostic information from different (and typically siloed or mutually exclusive) domains into a comprehensive, synthesized view in which time correlations between domain-specific events can easily be detected and identified.

Additionally, the display 300 may be continually updated (with the most recent domain-specific diagnostic information) as time progresses, and therefore may be a continually or rolling display. A user may be able to scroll forwards and backward in time to view event data of the different domains 302-318.

Further, in some embodiments, a user may be able to select a specific domain and filter the event data included in the domain, so that only a subset of the domain-specific event data is presented on the display. For example, the alarm domain 302c may be filtered to display event data pertaining to only alarm severity of a selected level (e.g., high, medium, low) and which are service-affecting; IP resource-related event data 308 may be filtered to only display events related to ONTs being assigned IP addresses; weather-related event data 318 may be filtered to only display events indicative of rainfall; and the like. Indeed, in some embodiments, a user may be able to select which specific domains 302-318 are to be included in the display 300 so that the user may detect and investigate any correlations between event occurrences across various domains.

As such, in view of the above, via the display 300, a user may be able to quickly and visually identify existences of anomalies reported by end-users, and in particular those anomalies which occur intermittently. Additionally, a user may be able to quickly and visually detect temporal correlations (e.g., an overlap of types of event occurrences, a sequential ordering of event occurrences, a repeated pattern of events happening behind or before other events, etc.) between domain-specific events across multiple domains. Based on the detected temporal correlations, a user may be able to identify potential sources of the anomalies occurring within the PON 100 and take corresponding steps to mitigate (and in some situations, adjust, repair, and/or replace sources of) the anomalies. Advantageously, the display 300 allows the integrated domain information to be easily and clearly represented on the client device 150 in a visually-synthesized view, which is particularly important and needed for portable client devices 150 which have smaller screens where flipping between separate displays provided by different domain servers may be cumbersome and inconvenient, not to mention different time scales, data presentation paradigms (whether graphical or not), and the like. As such, diagnosing network anomalies may be performed more quickly and accurately as compared to using prior art techniques.

Indeed, in addition to presenting integrated, multi-domain diagnostic information on the display view 300 at the client device 150, the PON diagnostic and repair application 152 may generate and provide instructions for diagnosing the network anomaly based on the integrated, multi-domain diagnostic information. For example, based on a temporal correlation between events of two or more different domains (e.g., an overlap, a pattern of occurrence, etc.), the PON diagnostic and repair application 152 may prompt the user to initiate a diagnostic of an optical component of the PON corresponding to a first domain, a diagnostic of another component of the PON corresponding to a second domain, a diagnostic of another component of the PON corresponding to a third domain, etc. In some implementations, the PON diagnostic and repair application 152 may provide step-by-step instructions, at the client device 150, to guide the user in initiating the diagnostics and analyzing the results. Alternatively, the PON diagnostic and repair application 152 may automatically initiate the diagnostics based on the detected temporal correlation, and may display results of the initiated diagnostics on the display 300.

In some situations, the PON diagnostic and repair application 152 may analyze the results of the diagnostics (in some cases, in conjunction with the other domain-specific diagnostic information) to determine a source of the anomaly and a corresponding mitigating action. For example, the PON diagnostic and repair application 152 may determine that a particular optical or non-optical component of the PON 100 needs to be replaced, that the particular optical or non-optical component needs to be reset (e.g., by turning the power on and off), that one or more configurations and/or settings of the particular optical or non-optical component of the PON 100 need to be changed, that an outlet powering the particular optical or non-optical component needs to be reset, that an Ethernet cable connected to the particular optical or non-optical component needs to be replaced, that an optical splitter needs to be replaced, that the particular optical or non-optical components needs to be repaired, etc. Other example of mitigation actions include re-routing one or more optical services provided by the PON based on the source of the anomaly, de-activating at least one activated optical component of the PON, activating at least one spare optical component of the PON, adjusting a setting of an operational optical component of the PON, re-configuring the operational optical component, or executing one or more diagnostics within the PON, to name a few.

Further, the PON diagnostic and repair application 152 may generate and provide instructions (e.g., at the client device 150) for repairing, resetting, re-configuring, or replacing an optical or non-optical component, which may be a detected source of the anomaly. For example, when a fiber is bent, the PON diagnostic and repair application 152 may generate instructions to straighten out the fiber. When the fiber is dirty, the PON diagnostic and repair application 152 may generate instructions for cleaning the fiber. When the fiber is broken, the PON diagnostic and repair application 152 may generate instructions for replacing the fiber with another fiber. In another example, when the LMTU 106a needs to be reset, the PON diagnostic and repair application 152 may generate instructions for resetting the LMTU 106a. When the LMTU 106a is not receiving power from the outlet, the PON diagnostic and repair application 152 may generate instructions for resetting the outlet to the LMTU 106a. Furthermore, when the LMTU 106a needs to be replaced, the PON diagnostic and repair application 152 may generate instructions for removing the current LMTU 106a and installing a new ONT.

While these are a few examples of the causes of network anomalies and corresponding instructions for mitigating the network anomalies, the PON diagnostic and repair application 152 may identify any suitable source or cause of a network anomaly and generate corresponding instructions for mitigating the network anomaly according to the identified cause or source.

In any event, the PON diagnostic and repair application 152 may then present the instructions to the user, for example, as step-by-step instructions as the user repairs, replaces, or adjusts the LMTU 106a. The PON diagnostic and repair application 152 may present the instructions audibly via a speaker of the client device 150 or visually on a display. In some scenarios, the PON diagnostic and repair application 152 may transition to an augmented reality mode that presents real-world imagery on a transparent display in the field of view of the client device 150, and more specifically the camera view of the camera. In some implementations, the PON diagnostic and repair application 152 may overlay the instructions on the transparent display in a display area within the transparent display that does not obstruct the user's view of the LMTU 106a, such as when the client device 150 is smart glasses or a VR headset. When the client device 150 is a tablet or smart phone, the user may also be able to hold their tablet or smart phone up to the LMTU 106a and see the instructions for repairing the LMTU 106a. In addition to overlaying text instructions on the real-world imagery in the augmented reality mode, the PON diagnostic and repair application 152 may overlay augmented reality features on the real-world imagery to assist the user in repairing the LMTU 106a or other optical terminal, such as graphics or icons which highlight portions of the real-world imagery.

FIG. 4 depicts a flow diagram of an example method 400 for diagnosing anomalies in a PON 100. The method 400 may be performed by the PON diagnostic and repair application 152, the client device 150, the computing device 125, and/or the servers 130, either singly or cooperatively, for example. However, for ease of discussion and not for limitation purposes, the method 400 is discussed below as being performed by a client device 150, although one of ordinary skill in the art will appreciate that the techniques of the method 400 may be easily performed additionally or alternatively by the computing device 125 and/or the servers 130. Additionally, for ease of discussion but not for limitation purposes, the method 400 is described below with respect to an LMTU 106a, but is understood that, in embodiments, the method 400 may be utilized with any type of optical component of the PON 100, such as another LMTU 106, 107, an FDH 116, an FDT, an OLT 102, a splitter, a router, and/or other components of the PON 100 which operate on optical transmissions within the PON 100. Further, for ease of reference and not for limitation purposes, the method 400 is discussed with simultaneous reference to the PON 100 of FIG. 1 and the displays 200, 250, 300 of FIGS. 2A, 2B, and 3. Still further, in embodiments, the method 400 may include additional and/or alternate blocks other than those discussed below.

At block 402, the method 400 includes establishing a communication session with an optical component of the PON 100 . . . . For example, the PON diagnostic and repair application 152 may establish a communication session with an optical component via a direct, short-range wireless link or via multiple wired, optical, and/or wireless links included in the networks 128. In an illustrative but non-limiting example scenario, the client device 150 (in some cases, via the PON diagnostic and repair application 152) may establish a communication session with the LMTU 106a, e.g., via one or more cloud based servicing platform links included in the network 128 or via short-range communication link, which may be (but not necessarily is) a short-range wireless communication link. For instance, the client device 150 and the LMTU 106*a* may connect using Wi-Fi, Bluetooth, NFC, etc.

In an example implementation, to establish 402 the communication session with the LMTU 106*a*, a user may tap the client device 150 to the LMTU 106*a* to cause the PON diagnostic and repair application 152 to transmit an NFC signal to the LMTU 106*a* requesting to pair the devices. The PON diagnostic and repair application 152 may provide instructions to the user to do so, e.g., in a manner such as illustrated in display 200 of FIG. 2A. The LMTU 106*a* may receive the NFC signal and establish a communication session between the two devices 150, 106*a* in response to the request. In another example, the LMTU 106*a* may broadcast a Wi-Fi signal. When the client device 150 is within communication range of the LMTU 106*a*, the PON diagnostic and repair application 152 may receive the Wi-Fi signal, request to connect to the LMTU 106*a* via the broadcasted Wi-Fi network, and indicate as such to the user, e.g., in a manner such as illustrated in the display 250 of FIG. 2B. Of course, any suitable technique for establishing 402 a communication session between the client device 150 and the LMTU 106*a* may be utilized, including using any number of wired and/or wireless links and/or networks. For example, the client device 150 and the LMTU 106*a* may establish 402 a communication session via a cloud computing platform.

At a block 405, the method 400 may include receiving, at the client device 150, first diagnostic information of a first one or more domains from the LMTU 106*a*, e.g., via the short-range communication link. The receiving 405 of the first diagnostic information may be responsive to the establishing 402 of the communication session, for example. The first diagnostic information may include diagnostic information 302 collected at the LMTU 106*a*, which may include real-time diagnostic information, historical diagnostic information, diagnostic information pertaining to the LMTU 106*a*, and/or diagnostic information pertaining to other optical components of the PON 100, such as described elsewhere in this disclosure. For example, the first diagnostic information collected at the LMTU 106*a* may include diagnostic information of the LMTU 106*a*, for example, a download rate at the LMTU 106*a*, an upload rate at the LMTU 106*a*, a light level metric at the LMTU 106*a*, a distance from the LMTU 106*a* to the OLT 102, a temperature metric at the LMTU 106*a*, a metric collected at the LMTU 106*a* indicative of PON utilization, an uplink metric for the LMTU 106*a*, etc. Additionally or alternatively, the first diagnostic information may include indications of events occurring at the LMTU 106*a*, such as optical link losses, alarms, dying gasps, bit error rate thresholds, standard deviations from historical values, changes in normal operating values above respective thresholds, events affecting services, and/or other types of domains. The first diagnostic information of the first domain may relate or pertain to a network anomaly within the PON, for example.

At a block 408, the method 400 may include rendering a first view of the first diagnostic information on a user interface of the client device 150. The first view may include graphical indications of occurrences of a first event of a first domain (e.g., a first event specific to the first domain) and respective start times, stop times, and durations of the occurrences of the first event, e.g., one of reference 302*a*, 302*b*, or 302*c* of the display 300. When the received first diagnostic information includes multiple domains and/or refers to multiple different optical components, the graphical indications of respective events occurring in each of the multiple domains and/or each of the multiple optical components may be thusly indicated, e.g., references 302*a*, 302*b*, and 302*c*, collectively. For example, as shown in FIG. 3, domains 302*a*, 302*b*, 302*b* each are respectively indicated on the display 300 by its own row, and each of the rows corresponding to the domains 302*a*, 302*b*, and 302*c* are layered and temporally aligned.

At a block 410, the method 400 may include obtaining, at the client device 150, second diagnostic information of a second domain related to the PON. The second domain may correspond to, for example, weather, communication gateways utilized by or included in the PON 100, IP addresses of optical components of the PON 100, customer support issues, utilization of optical components and/or links of the PON, analysis of an aggregation of data generated by multiple components (e.g., both optical components and non-optical components) of the PON, and/or other domains pertaining directly to the PON and/or affecting the PON, e.g., such as described elsewhere within this disclosure.

In some embodiments (not shown), the block 410 may include establishing, e.g., by the client device 150 or by the PON diagnostic and repair application 152, a second communication session with a respective servicing platform of the second domain, e.g., via one or more optical links of the PON 100, one or more wireless links of the PON 100, and/or the networks 128, and obtaining 410 the second diagnostic information via the established second communication session. The respective servicing platform may be included on the servers 130 of the PON 100, or may be included on third-party servers 130 remote from the PON 100. The second diagnostic information may be obtained via the second communication session. For example, the client device 150 may request the respective servicing platform for the second diagnostic information, and/or the respective servicing platform may continually transmit or stream the second diagnostic information to the client device 150.

In some embodiments (not shown), the method 400 further includes obtaining, via the user interface of the client device, a selection of the second domain, and the obtaining 410 of the respective diagnostic information of the second domain is responsive to the obtaining of the selection. In some embodiments (not shown), the obtaining 410 of the respective diagnostic information of the second domain is responsive to a result of a diagnostic which was executed in the PON 100. For instance, the results of the executed diagnostic may be included in the respective diagnostic information of the second domain, and/or the second domain may be another domain related to the results of the executed diagnostic.

At the block 412, the method 400 may include layering, on the first view rendered on the user interface, a second view of the second diagnostic information. The second view including graphical indications of occurrences of a second domain-specific event corresponding to the second diagnostic information and respective start times, stop times, and durations of the occurrences of the second event, for example. Additionally, the layering may include aligning respective temporal axes of the first view and the second view, thereby generating an integrated multi-domain graphical view 300. As such, the integrated, multi-domain graphical view 300 may provide a visually-synthesized view of occurrences of domain-specific events across a multiplicity of domains related to the PON, where the visually-synthesized view includes a temporally aligned view of occurrences and durations of the domain-specific events occurring in the multiple different domains related to the PON. The integrated multi-domain graphical view 300 may include a user-manipulatable scrolling timeline, in embodiments.

At the block 415, the method 400 may include detecting, via the integrated multi-domain graphical view 300, a temporal correlation between the first events and the second events, the temporal correlation associated with a network anomaly. For example, the temporal correlation may indicate that occurrences of the first and second events overlap in time, the temporal correlation may indicate that occurrences of the second event typically occur N minutes after the occurrences of the first events, etc.

At the block 418, the method 400 may include initiating respective diagnostics at a first optical component corresponding to the first events and at a second optical component corresponding to the second events, thereby diagnosing the network anomaly. The initiating 418 of the respective diagnostics may be responsive to the detecting 415 of the temporal correlation, for example. The results of the respective diagnostics may be indicative of one or more sources of the network anomaly, where the one or more sources may include an optical component of the PON and/or a non-optical component of the PON 100. For example, the PON diagnostic and repair application 152 may automatically determine or detect one or more sources of the anomaly based on the results of the initiated respective diagnostics, and/or the PON diagnostic and repair application 152 may present the results of the initiated diagnostics to the user, e.g., by integration into the display 300 or by some other means, and the user may determine the one or more sources of the anomaly based on the results.

In some embodiments (not shown), the method 400 may execute with respect to more than two domains. For example, the method 400 may include establishing respective communication sessions with respective servicing platforms of three or more domains related to the PON and obtaining respective diagnostic information of the three or more domains via the respective communication sessions. Respective views of the respective diagnostic information obtained from the three or more domains may be layered onto the user interface, e.g., in a temporally aligned manner, e.g., in a manner such as illustrated in the display 300, to thereby generate the integrated multi-domain graphical view. Based on the integrated multi-domain graphical view, at least one second temporal correlation between three or more domain-specific events of different domains may be detected (e.g., by the user, by the PON diagnostic and repair application 152, by another application at the client device 150, etc.). The at least one second temporal correlation may indicative of the network anomaly and/or another network anomaly, and the method 400 may further include initiating respective diagnostics at respective optical components corresponding to the three or more events responsive to the detecting of the at least one second temporal correlation.

In some situations (not shown), the integrated multi-domain graphical view 300 may also include historical domain-specific event data (e.g., which may be stored in the data stores 132). For example, upon detecting a current temporal correlation between domain-specific events respectively occurring in real-time in the two or more domains, additional historical data of the two or more domains may be obtained from the data stores 132 and integrated into the multi-domain graphical view 300 to investigate the detected temporal correlation, e.g., to ascertain how long the temporal correlation has been occurring, to detect any other domain-specific events which are temporally correlated to the current temporal correlation, to identify possible sources of a network anomaly related to the current temporal correlation, etc. For instance, the user may instruct the PON diagnostic and repair application 152 to obtain and integrate historical event data of one or more domains, and the user may scroll backwards in time to view the updated integrated multi-domain event data including the requested historical event data.

In some embodiments (not shown), the method 400 may include initiating a mitigating action for the network anomaly based on at least one of: the detecting of the temporal correlation, results of the respective diagnostics of the first optical component, or results of the respective diagnostics of the second optical component. The mitigating action may be initiated by the PON diagnostic and repair application 152, in some implementations. For example, the application 152 may automatically initiate (and in some situations, execute) the mitigating action, or the application 152 may provide, via the user interface, instructions for the user to execute the mitigating action, such as in manners previously described above. Mitigating actions may include changing a setting or configuration of one or more optical and/or non-optical components, repairing one or more optical and/or non-optical components, replacing one or more optical and/or non-optical components, re-routing one or more optical services provided by the PON based on the detected source(s) of the network anomaly, de-activating at least one activated optical component of the PON, activating at least one spare optical component of the PON, and/or executing another diagnostic within the PON, to name a few. Of course, other mitigating actions are possible.

Additional Considerations

Although the systems, methods, and techniques disclosed herein generally are directed to diagnosing anomalies (e.g., faults, degradation of service, loss of service, etc.) occurring within a passive optical network (PON), one of ordinary skill in the art will recognize that the systems, methods, and techniques disclosed herein may easily be applied to diagnosing anomalies occurring within other types of communications networks, such as copper networks (e.g., Digital Subscriber Line (DSL) networks), free space optics (FSO) networks, etc. In such other types of communications networks, the systems, methods, and techniques may include integrating diagnostic information (e.g., in real-time as the diagnostic information is generated by various components of the subject communications network) from multiple domains of the subject communications network into an integrated, multi-domain graphical view, e.g., based on temporal precedence and optionally frequency precedence as applicable to the subject communications network. Of course, the various components of the subject communications network may be different than the components of a PON, and the multiple domains of the subject communications network may be different than the multiple domains of a PON.

For example, for a copper communications network, domain-specific information may include information from domains similar to those of a PON, such as (but not limited to) weather 318, technical support 310, and swarm intelligence 315. Domain-specific information of a copper communications network may also include information from one or more domains different than domains of a PON. Such domains of a copper communications network may include, for example, signal level, attenuation, signal-to-noise ratio (SNR), power level, corrected codewords, uncorrected code words, errored seconds, and events from other loops in a same physical grouping of multiple copper cables within a same sheath (e.g., a same binder), to name a few. Further, in copper communications networks, domains may include frequency-related domains such as the channel transfer function logarithm (e.g., Hlog curve or HLOG) of loops, bit loading, quiet line noise (QLN), and data/information from other loops in a same binder. Of course, other domains of copper communications networks may be possible and utilized in conjunction with the systems, methods, and techniques described herein.

In another example, for a free space optics communications network, domain-specific information may include information from domains similar to those of a PON, such as (but not limited to) weather 318 (e.g., wind, precipitation, humidity, etc.), technical support 310, and swarm intelligence 315. Domain-specific information of an FSO network may also include information from one or more other types of domains pertaining to FSO networks, such as bit error rate, signal-to-noise ratio (SNR), link loss events, and receive (Rx) power, to name a few. Of course, other domains of FSO networks may be possible and utilized in conjunction with the systems, methods, and techniques described herein.

Further, one skilled in the art will understand that the systems, methods, and techniques disclosed herein may be easily applied to hybrid communications networks, such as those including both copper communications network components and PON components, those including both PON components and free space optics components, those including copper, PON, and FSO components, etc. In such hybrid communications networks, the systems, methods, and techniques described herein may integrate diagnostic information from multiple domains across the multiple different types of communications networks, e.g., based on temporal and/or frequency precedence as desired.

Additionally, the above description refers to block diagrams of the accompanying drawings. Alternative implementations of the example represented by the block diagrams include one or more additional or alternative elements, processes and/or devices. Additionally or alternatively, one or more of the example blocks of the diagrams may be combined, divided, re-arranged or omitted. Components represented by the blocks of the diagrams are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may be combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims. By way of example, and not limitation, the disclosure herein contemplates at least the following examples:

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112 (f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method of diagnosing network anomalies in a passive optical network (PON), the method comprising:
establishing, by a client device, a communication session with an optical component included in the PON;
receiving, at the client device from the optical component via the communication session, first diagnostic information of a first domain corresponding to the optical component;
rendering, on a user interface of the client device, a first view of the first diagnostic information, the first view including graphical indications of occurrences of a first event occurring in the first domain and respective durations of the occurrences of the first event;

obtaining, at the client device, second diagnostic information of a second domain related to the PON;

layering, on the first view rendered on the user interface, a second view of the second diagnostic information, the second view including graphical indications of occurrences of a second event occurring in the second domain and respective durations of the occurrences of the second event, the layering including aligning respective temporal axes of the first view and the second view, and the layering thereby generating an integrated multi-domain graphical view;

detecting, via the integrated multi-domain graphical view, a temporal correlation between the occurrences of the first event and the occurrences of the second event, the temporal correlation indicative of a network anomaly; and responsive to the detecting of the temporal correlation, initiating respective diagnostics for each of a first optical component corresponding to the occurrences of the first event and a second optical component corresponding to the occurrences of the second event, thereby diagnosing the network anomaly.

2. The method of claim 1, wherein the establishing of the communication session is via a short-range communication link or via a cloud-based services platform.

3. The method of claim 1, wherein the network anomaly is a degradation in an optical service or a loss of the optical service.

4. The method of claim 1, wherein the first domain is one of: optical link losses, alarms, dying gasps, bit error rate thresholds, standard deviations from historical values, changes in normal operating values above respective thresholds, or service-affecting events detected at the optical component, the dying gasps including signals that are transmitted by optical components upon imminence of the optical components going off-line.

5. The method of claim 4, wherein the second domain is another one of: the optical link losses, the alarms, the dying gasps, the bit error rate thresholds, the standard deviations from historical values, the changes in normal operating values above respective thresholds, or the service-affecting events, and the receiving of the second diagnostic information is via the communication session.

6. The method of claim 4, wherein:

the second domain corresponds to: weather, communication gateways, IP addresses of optical components, customer support issues, utilization of optical components and/or links of the PON, or analysis of data generated by the PON;

the communication session is a first communication session;

the method further comprises establishing, by the client device, a second communication session with a respective servicing platform of the second domain; and the obtaining of the second diagnostic information is via the second communication session.

7. The method of claim 6, wherein the temporal correlation is a first temporal correlation, and the method further comprises:

establishing, by the client device, respective communication sessions with respective servicing platforms of three or more domains related to the PON, the three or more domains including the first domain and the second domain;

obtaining a respective set of diagnostic information of each of the three or more domains via the respective communication sessions;

layering, on the user interface, respective views of the three or more sets of diagnostic information, each respective view including graphical indications of occurrences of a respective event occurring in a respective one of the three or more domains and respective durations of the occurrences of the respective event, the layering including aligning respective temporal axes of the three or more views, and the layering of the respective views of the three or more sets of diagnostic information thereby generating the integrated multi-domain graphical view; and detecting, via the integrated multi-domain graphical view, at least one second temporal correlation between the occurrences of the respective events in the three or more domains, the at least one second temporal correlation indicative of the network anomaly or another network anomaly.

8. The method of claim 7, further comprising initiating respective diagnostics at respective optical components corresponding to the occurrences of the respective events in the three or more domains responsive to the detecting of the at least one second temporal correlation.

9. The method of claim 1, further comprising obtaining, via the user interface of the client device, a selection of the second domain, and the obtaining of the respective diagnostic information of the second domain is responsive to the obtaining of the selection.

10. The method of claim 1, wherein the integrated multi-domain graphical view includes a user-manipulatable scrolling timeline.

11. The method of claim 1, further comprising initiating, a mitigating action for the network anomaly based on at least one of: the detecting of the temporal correlation, results of the respective diagnostics of the first optical component, or results of the respective diagnostics of the second optical component.

12. The method of claim 11, wherein the mitigating action includes at least one of: re-routing one or more optical services provided by the PON, de-activating at least one activated optical component of the PON, activating at least one spare optical component of the PON, adjusting a setting of an operational optical component of the PON, re-configuring the operational optical component, or executing a diagnostic within the PON.

13. The method of claim 1, wherein the optical component is a last mile termination unit (LMTU), a fiber distribution hub (FDH), a fiber distribution terminal (FDT), or an optical line terminal (OLT).

14. The method of claim 1, further comprising determining a source of the network anomaly based on results of the initiated respective diagnostics.

15. One or more non-transitory computer-readable memories storing computer-executable instructions thereon that, when executed by one or more processors, cause the one or more processors to:

establish a communication session with an optical component included in a passive optical network (PON);

receive, from the optical component via the communication session, first diagnostic information of a first domain corresponding to the optical component;

render, on a user interface, a first view of the first diagnostic information, the first view including graphical indications of occurrences of a first event occurring in the first domain and respective durations of the occurrences of the first event;

obtain second diagnostic information of a second domain related to the PON;

layer, on the first view rendered on the user interface, a second view of the second diagnostic information, the second view including graphical indications of occurrences of a second event occurring in the second domain and respective durations of the occurrences of the second event, and the layering thereby generating an integrated multi-domain graphical view in which temporal axes of the first view and the second view are aligned;

detect, via the integrated multi-domain graphical view, a temporal correlation between the occurrences of the first event and the occurrences of the second event, the temporal correlation indicative of a network anomaly; and responsive to the detection of the temporal correlation, initiate respective diagnostics for each of a first optical component corresponding to the occurrences of first event and a second optical component corresponding to the occurrences of second event, thereby diagnosing the network anomaly.

16. The one or more non-transitory computer-readable memories of claim 15, wherein the establishment of the communication session is via a short-range communication link or via a cloud-based services platform.

17. The one or more non-transitory computer-readable memories of claim 15, wherein the network anomaly is a degradation in an optical service or a loss of the optical service.

18. The one or more non-transitory computer-readable memories of claim 15, wherein the first domain is one of: optical link losses, alarms, dying gasps, bit error rate thresholds, standard deviations from historical values, changes in normal operating values above respective thresholds, or service-affecting events detected at the optical component, the dying gasps including signals that are transmitted by optical components upon imminence of the optical components going off-line.

19. The one or more non-transitory computer-readable memories of claim 18, wherein:

the second domain is another one of: the optical link losses, the alarms, the dying gasps, the bit error rate thresholds, the standard deviations from historical values, the changes in normal operating values above respective thresholds, or the service-affecting events, detected at the optical component; and the second diagnostic information is obtained via the communication session.

20. The one or more non-transitory computer-readable memories of claim 18, wherein:

the second domain corresponds to: weather, communication gateways, IP addresses of optical components, customer-initiated issues, utilization of optical components and/or links of the PON, or analysis of data generated by the PON;

the communication session is a first communication session; and the second diagnostic information of the second domain is obtained via a second communication session established with a respective servicing platform of the second domain.

21. The one or more non-transitory computer-readable memories of claim 20, wherein the computer-executable instructions cause the one or more processors further to:

establish respective communication sessions with respective servicing platforms of three or more domains related to the PON, the three or more domains including the first domain and the second domain;

obtain a respective set of diagnostic information of each of the three or more domains via the respective communication sessions;

layer, on the user interface, respective views of the three or more sets of diagnostic information, each respective view including graphical indications of occurrences of a respective event occurring in a respective one of the three or more domains and respective durations of the occurrences of the respective event, the layering including aligning respective temporal axes of the three or more views, and the layering of the respective views of the three or more sets of diagnostic information thereby generating the integrated multi-domain graphical view; and detect, via the integrated multi-domain graphical view, at least one second temporal correlation between the occurrences of the respective events in the three or more domains, the at least one second temporal correlation indicative of the network anomaly or another network anomaly.

22. The one or more non-transitory computer-readable memories of claim 21, wherein the computer-executable instructions cause the one or more processors further to initiate respective diagnostics at respective optical components corresponding to the occurrences of the respective events in the three or more domains responsive to the detection of the at least one second temporal correlation.

23. The one or more non-transitory computer-readable memories of claim 15, wherein the second diagnostic information of the second domain is obtained responsive to a selection, via the user interface, of the second domain.

24. The one or more non-transitory computer-readable memories of claim 15, wherein the integrated multi-domain graphical view includes a user-manipulatable scrolling timeline.

25. The one or more non-transitory computer-readable memories of claim 15, wherein the computer-executable instructions cause the one or more processors further to initiate a mitigating action for the network anomaly based on at least one of: the detection of the temporal correlation, results of the respective diagnostics of the first optical component, or results of the respective diagnostics of the second optical component.

26. The one or more non-transitory computer-readable memories of claim 25, wherein the mitigating action includes at least one of: a re-routing one or more optical services provided by the PON, a de-activation at least one activated optical component of the PON, an activation of at least one spare optical component of the PON, an adjustment of a setting of an operational optical component of the PON, a re-configuration of the operational optical component, or an execution of a diagnostic within the PON.

27. The one or more non-transitory computer-readable memories of claim 15, wherein a client device associated with the PON includes at least a portion of the computer-executable instructions and at least a portion of the one or more processors.

28. The one or more non-transitory computer-readable memories of claim 15, wherein a back-end computing device associated with the PON includes at least a portion of the computer-executable instructions and at least a portion of the one or more processors.

29. The one or more non-transitory computer-readable memories of claim 15, wherein the optical component is a last mile termination unit (LMTU), a fiber distribution hub (FDH), a fiber distribution terminal (FDT), or an optical line terminal (OLT).

30. The one or more non-transitory computer-readable memories of claim 15, wherein a source of the network anomaly is not the optical component.

\* \* \* \* \*